Patented June 27, 1933

1,916,107

UNITED STATES PATENT OFFICE

JOSEPH GYR, OF BASEL, SWITZERLAND, ASSIGNOR TO SOCIETY OF CHEMICAL INDUSTRY IN BASLE, OF BASEL, SWITZERLAND

AZO DYESTUFF AND PROCESS OF MAKING SAME

No Drawing. Application filed February 23, 1933, Serial No. 658,243, and in Switzerland March 2, 1932.

It is known that, generally speaking, the direct-dyeing dyestuffs can be used for dyeing artificial silk made from regenerated cellulose. An obstacle to their general use, however, is the known fact that many of these dyestuffs produce so-called stripy dyeings on piece goods. This is particularly the case with the most important of the blue direct-dyeing azo-dyestuffs of the benzidine series, the dyestuff from 1 mol. tetrazotized 4:4'-diamino-3:3'-dimethoxy-diphenyl and 2 mol. 1-amino-8-hydroxynaphthalene-2-:4-disulfonic acid (alkaline coupling).

According to the present invention new dyestuffs are produced which have the valuable property of dyeing viscose silk piece-goods pure greenish- to reddish-blue tints. The value of the new dyestuffs lies in the combination of the purity of the shade with the excellent uniformity of the dyeings on so-called stripy viscose. The new dyestuffs are obtained by uniting tetrazotized 4:4'-diamino-diphenylene, for example tetrazotized 4:4'-diamino-diphenyl or a derivative thereof substituted in 3:3'-position by alkyl or alkoxy-groups, such as 4:4'-diamino-3:3'-dimethoxy-diphenyl, under alkaline conditions with 1 mol. 1-hydroxynaphthalene-4:8-disulfonic acid and 1 mol. of such a sulfonic acid of a 1-amino-8-hydroxynaphthalene which couples with diazo-compounds in the 7-position.

The sodium salts of the new dyestuffs correspond to the general formula

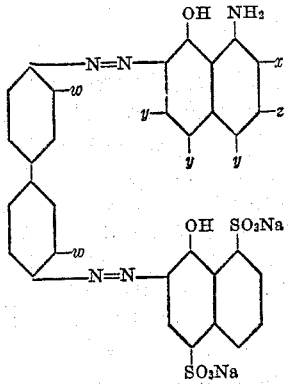

wherein one of the $y$'s stands for an $SO_3Na$-group and the other two $y$'s stand for hydrogen or an $SO_3Na$-group, $x$ and $z$ for hydrogen or an $SO_3Na$-group, wherein further the sum of the sulfonic groups marked by the letters $x$, $y$ and $z$ does not exceed the figure 2, and wherein no sulfonic group stands in ortho- or peri-position to the other, and finally wherein the two $w$'s stand for two hydrogen atoms or for two alkyl- or alkoxy-groups.

The new dyestuffs constitute in a dry state black powders which dissolve in water to blue solutions and dye viscose silk greenish- to reddish-blue tints which are destinguished by their purity combined with an excellent uniformity.

The following examples illustrate the invention.

Example 1

The tetrazo-compound prepared in ordinary manner from 244 parts by weight of 3:3'-dimethoxy-4:4'-diamino-diphenyl is coupled in a solution rendered alkaline with sodium carbonate with 239 parts by weight of 1-amino-8-hydroxynaphthalene-4-sulfonic acid, and, after the coupling is complete, with 304 parts by weight of 1-hydroxynaphthalene-4:8-disulfonic acid. The dyestuff thus obtained is then isolated by heating and salting out, filtered and dried. It constitutes a dark powder which dissolves in water to a pure blue solution. On cotton or artificial fibers from regenerated cellulose it yields pure blue tints, particularly valuable dyeings being obtained on viscose silk. The formula of the new dyestuff in the form of its sodium salts is very probably as follows:—

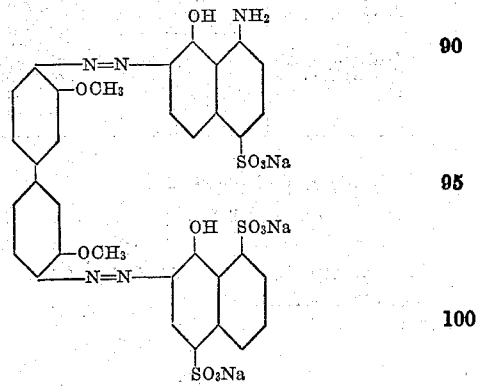

Example 2

10 kilos of artificial silk are wetted and rinsed in water of 60–70° C.; at the same time a dye-bath is prepared by dissolving 0.1 kilo of the dyestuff from 1 mol. tetrazotized 4:4'-diamino-3:3'-dimethoxy-diphenyl and 1 mol. 1-hydroxynaphthalene-4:8-disulfonic acid and 1 mol. 1-amino-8-hydroxynaphthalene-3:6-disulfonic acid in 100 litres of boiling water. The formula of the above dyestuff in the form of its sodium salt is very probably:—

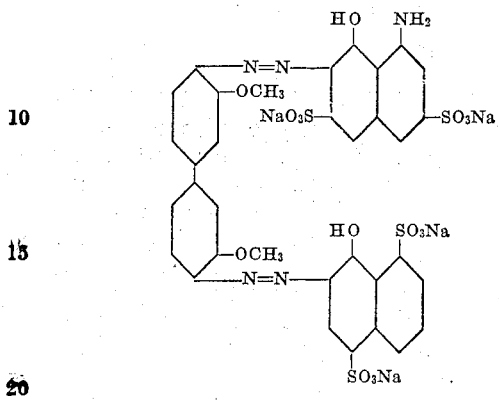

When dissolution is complete there is added so much water that a dye-bath of 350 litres at 40–50° C. is finally obtained. The wetted viscose silk is entered into this bath at the said temperature. The bath is heated gradually to 80–85° C. and after dyeing has continued for ¼ hour, 2–3 kilos of crystallized sodium sulphate are added and dyeing is further continued for 1 hour at 80–85° C. The goods are then rinsed and dried. The viscose silk is dyed even greenish-blue tints.

The following table illustrates further dyestuffs which can be produced by this invention:—

| Tetrazotizing component | 1st coupling component | 2nd coupling component | Colour on viscose silk |
|---|---|---|---|
| 4:4'-diamino-3:3'-dimethyl-diphenyl | 1-hydroxynaphthalene-4:8-disulfonic acid | 1-amino-8-hydroxy-naphthalene-4-sulfonic acid | Blue |
| 4:4'-diamino-3:3'-dimethoxydiphenyl | 1-hydroxynaphthalene-4:8-disulfonic acid | 1-amino-8-hydroxy-naphthalene-2:4-disulfonic acid | Greenish-blue |
| 4:4'-diamino-3:3'-dimethyldi-phenyl | 1-hydroxynaphthalene-4:8-disulfonic acid | 1-amino-8-hydroxynaphthalene-2:4-disulfonic acid | Greenish-blue |

What I claim is:—

1. Process for the production of new dyestuffs, consisting in coupling one molecular proportion of a tetrazotized diphenyl of the general formula

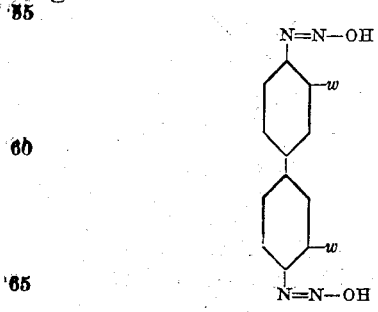

wherein the two $w$'s stand for hydrogen, alkyl or alkoxy-groups, in an alkaline medium with one molecular proportion of 1-hydroxynaphthalene-4:8-disulfonic acid, and one molecular proportion of such a sulfonic acid of 1-amino-8-hydroxynaphthalene which couples in the 7-position with diazo-compounds.

2. Process for the production of a new azo-dyestuff, consisting in coupling one molecular proportion of tetrazotized dianisidine in an alkaline medium with one molecular proportion of 1-hydroxynaphthalene-4:8-disulfonic acid and one molecular proportion of 1-amino-8-hydroxynaphthalene-3:6-disulfonic acid.

3. Process for the production of a new azo-dyestuff, consisting in coupling one molecular proportion of tetrazotized dianisidine in an alkaline medium with one molecular proportion of 1-hydroxynaphthalene-4:8-disulfonic acid and one molecular proportion of 1-amino-hydroxynaphthalene-4-sulfonic acid.

4. The new dyestuffs of the general formula

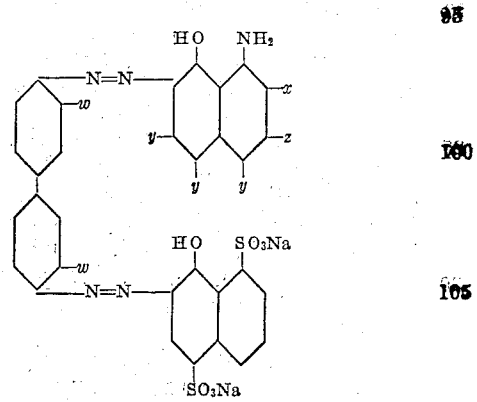

wherein one of the $y$'s stands for an $SO_3Na$-group and the other two $y$'s stand for hydrogen or an $SO_3Na$-group, $x$ and $z$ for hydrogen or an $SO_3Na$-group, wherein further the sum of the sulfonic groups marked by the letters $x$, $y$ and $z$ does not exceed the figure 2, and wherein no sulfonic group stands in ortho- or peri-position to the other, and finally wherein the two $w$'s stand for two hydrogen atoms or for two-alkyl- or alkoxy groups, which constitute in a dry state black powders which dissolve in water to blue solutions and dye viscose silk greenish- to reddish-blue tints which are distinguished by their purity combined with an excellent uniformity.

5. The new azo-dyestuff whose sodium salt very probably corresponds with the formula

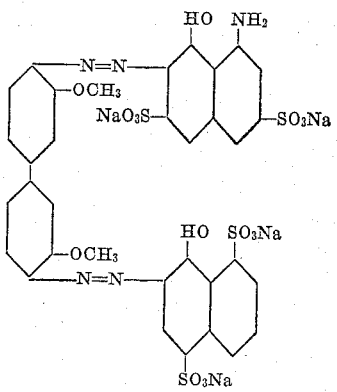

which product constitutes a black powder which dissolves in water to a green-blue solution, dyes cotton green-blue tints, and viscose silk greenish-blue tints which are distinguished by their purity combined with an excellent uniformity.

6. The new azo-dyestuff whose sodium salt very probably corresponds with the formula

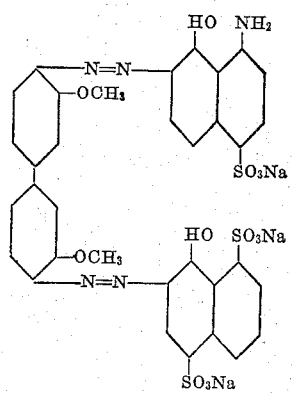

which product constitutes a black powder which dissolves in water to a green-blue solution, dyes cotton and viscose silk blue tints which are distinguished by their purity combined with an excellent uniformity.

In witness whereof I have hereunto signed my name this 15th day of February 1933.

JOSEPH GYR.